(12) United States Patent
Boyko

(10) Patent No.: US 7,775,024 B2
(45) Date of Patent: Aug. 17, 2010

(54) OFFSET FLOATING HITCH ROTARY MOWER APPARATUS

(75) Inventor: Stanley Joseph Boyko, Wakaw (CA)

(73) Assignee: Batoche Ag-Design (CA)

( * ) Notice: Subject to any disclaimer, the term of this patent is extended or adjusted under 35 U.S.C. 154(b) by 0 days.

(21) Appl. No.: 12/364,706

(22) Filed: Feb. 3, 2009

(65) Prior Publication Data

US 2009/0188228 A1 Jul. 30, 2009

Related U.S. Application Data

(62) Division of application No. 11/941,020, filed on Nov. 15, 2007, now abandoned.

(30) Foreign Application Priority Data

May 28, 2007 (CA) .................................. 2590382
May 28, 2007 (CA) .................................. 2590385

(51) Int. Cl.
*A01D 34/24* (2006.01)
(52) U.S. Cl. ....................................................... 56/15.2
(58) Field of Classification Search .................. 56/6, 56/7, 15.1–15.9, 11.9, DIG. 11, DIG. 14
See application file for complete search history.

(56) References Cited

U.S. PATENT DOCUMENTS

| 5,511,368 A | * | 4/1996 | Kocher | 56/15.2 |
| 6,854,250 B2 | * | 2/2005 | Boyko | 56/14.9 |

* cited by examiner

*Primary Examiner*—Robert E Pezzuto

(57) ABSTRACT

A rotary mower apparatus comprising a mower deck and two wings, with a plurality of rear wheels mounted behind the mower decks and at least two front wheels mounted ahead of the mower decks such that the mower decks ride along the ground; a floating hitch member is pivotally attached about a vertical and horizontal hitch axes to the front end of the central mower deck and pivotally attached at an opposite end to a tractor allowing the mower decks to float independently. The hitch member contains a mower angle control comprising a bell crank and a hydraulic actuator fixedly attached to a vertical shaft; and a driveline comprising gearboxes, drive shafts, universal joints, and double universal joints arranged such that the mower angle control can pivot the hitch about the vertical hitch axis moving the mower from a minimum offset position to the maximum offset position.

5 Claims, 3 Drawing Sheets

OFFSET FLOATING HITCH ROTARY MOWER APPARATUS

This invention is in the field of rotary mowers and in particular an offset floating hitch rotary mower apparatus to be used for roadside maintenance.

BACKGROUND

Rotary mowers are used for cutting vegetation of various types; crops and non-crop vegetation such as grass, weeds, and brush. Most commonly they are used to maintain roadside ditches and other public lands. These rotary mowers are often a wing-type rotary mower apparatus include two or three mower decks mounted side by side. The decks are offset fore and aft to provide the required over lap from the rotating blade under one deck to that of the adjacent deck, and the outside decks or wings, fold upward to allow for transport. The wing rotary mowers are most often of the trailing type; wherein the mower is supported by the wheels behind the deck and by the hitch on the towing tractor. A wing-type rotary mower of the trailing type is disclosed in U.S. Pat. No. 6,546,707 to Degelman et al.

Conventional trailing wing rotary mowers follow directly behind the tractor, and the mowers travel along or in the roadside ditch. In this situation, the mowers have to cope with a side sloped terrain as while as crossing intersecting road approaches. This often results in uneven cuts as well as gouging of the approach as the mower is pulled up and over.

When a ditch slope is at the typical 10 degree grade or when mowing in the roadside ditch, mowers pulled directly behind the tractor work safely, but can be extremely uncomfortable for the operator who sits at an angle in the tractor. When a tractor travels on ditch slopes with a steep grade or when steeper grades present themselves, a potentially dangerous situation occurs, that sometimes results in tractor roll over and injury or death to the operator. Some small degree of offset can be provided for trailing mowers by moving the tractor drawbar to one side, an adjustment commonly found on tractors. For conventional mounted rotary mowers, an offset is provided in the hitch of U.S. Pat. No. 4,195,860 to Helams, and as well in the hitch of U.S. Pat. No. 6,138,445 to Toth. In all cases the degree of offset is to small to allow the tractor to remain on the road while cutting the ditch. U.S. Pat. No. 5,957,475 to Pearen et al. provides an intermediate offset hitch apparatus that is hitched to the tractor on one side so as to tow behind the tractor. A rotary mower is hitched to the Pearen et al. apparatus at the rear of the opposite side. The apparatus essentially provides a hitching location and drivelines for the mower that is a clone of the tractor hitch it self, but offset sufficiently to allow the tractor to remain on the road while the mower cuts the slope of the ditch.

It would be desirable to have an offset rotary mower apparatus adapted for attachment to a tractor such that the rotary mower follows a path offset from the path of the tractor allowing the tractor to remain on the road while the mower cuts the slope of the roadside ditch It would be desirable to have an offset rotary mower that floated independent with respect to the tractor to allow the rotary mower to follow the ground contours, to ensure an even cut when mowing roadside ditches as while as preventing gouging of the road approaches when going over them.

SUMMARY OF THE INVENTION

It is an object of the present invention to provide an offset floating hitch rotary mower apparatus adapted for attachment to a tractor such that the rotary mower follows a path offset from the path of the tractor and wherein the amount of offset can be varied, to provide operator safety and convenience when mowing roadside ditches It is a further object of the present invention to provide an offset floating hitch rotary mower apparatus that allows the mower to float independent with respect to the tractor to allow the mower to follow the contours of the ground, ensuring an even cut.

The present invention provides, in one aspect, an offset wing-type rotary mower, the offset rotary mower apparatus adapted for attachment to a tractor for towing the rotary mower along the ground in an operating travel direction. The offset floating hitch rotary mower apparatus comprises a central mower deck and one or two wing mower decks pivotally attached to the center mower deck, a plurality of rear wheels mounted behind the central mower deck and at least two front wheels mounted to the front end of the central mower deck, a cutting blade element rotatably mounted under each mower deck, a floating hitch member, a drive, and a mower angle control. The floating hitch is pivotally attached at the rotary mower end thereof to the front wheel assembly so as to pivot about a substantially vertical axis and is adapted for pivotal attachment at a tow end thereof to the tractor about a substantially vertical tow axis. The attachment at the ends of the floating hitch on the horizontal hitch axis further allow the floating hitch and mower decks to float independent with respect to the tractor to follow the contours of the ground. The drive is adapted for connection to the tractor and is operative to transfer power from the tractor to rotate the cutting elements, and a mower angle control is operative to selectively pivot the floating hitch apparatus about the vertical axis with respect to front wheel assembly of the central mower deck. Thus front and rear wheels support the mower deck, and the floating hitch member allows the decks to float to follow the contours of the ground. The mower deck(s) are guided into the desired offset path by selectively pivoting the floating hitch member about the vertical axis with respect to the front wheel assembly of the central mower deck by using the mower angle control. A driveline is conveniently provided by a series of gearboxes, universal joints, double universal joints and drive shafts having a rotational axis coincidental with the input of a gearbox having an output connected to rotate one or more cutting elements.

DESCRIPTION OF THE DRAWINGS

While the invention is claimed in the concluding portions hereof, preferred embodiments are provided in the accompany detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
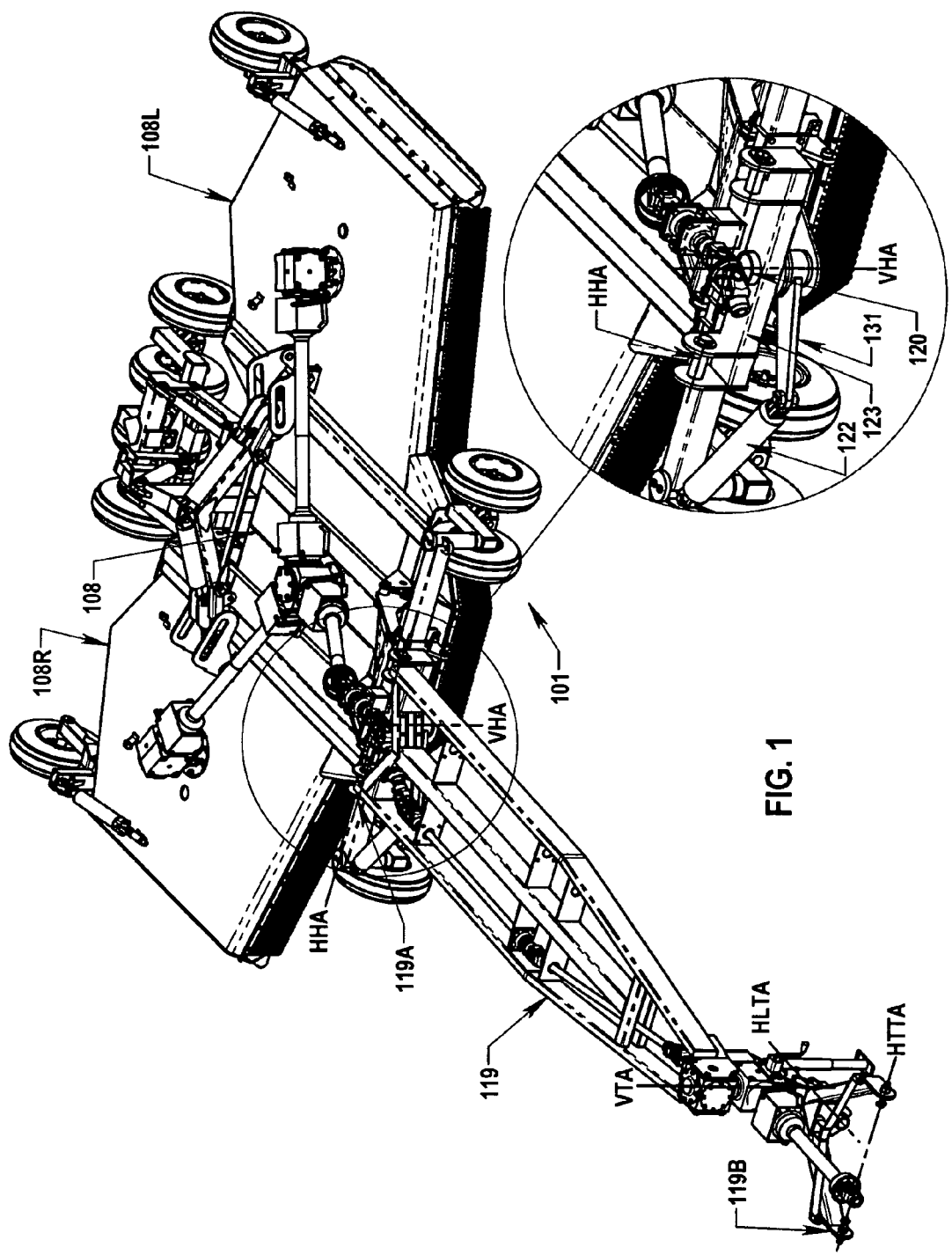
FIG. 1 is a front trimetric view of the offset floating hitch wing-type rotary mower apparatus embodiment of the invention with the floating hitch in a minimum offset position. Detail of the mower angle control with some hitch and drive components removed.
Figure 2:
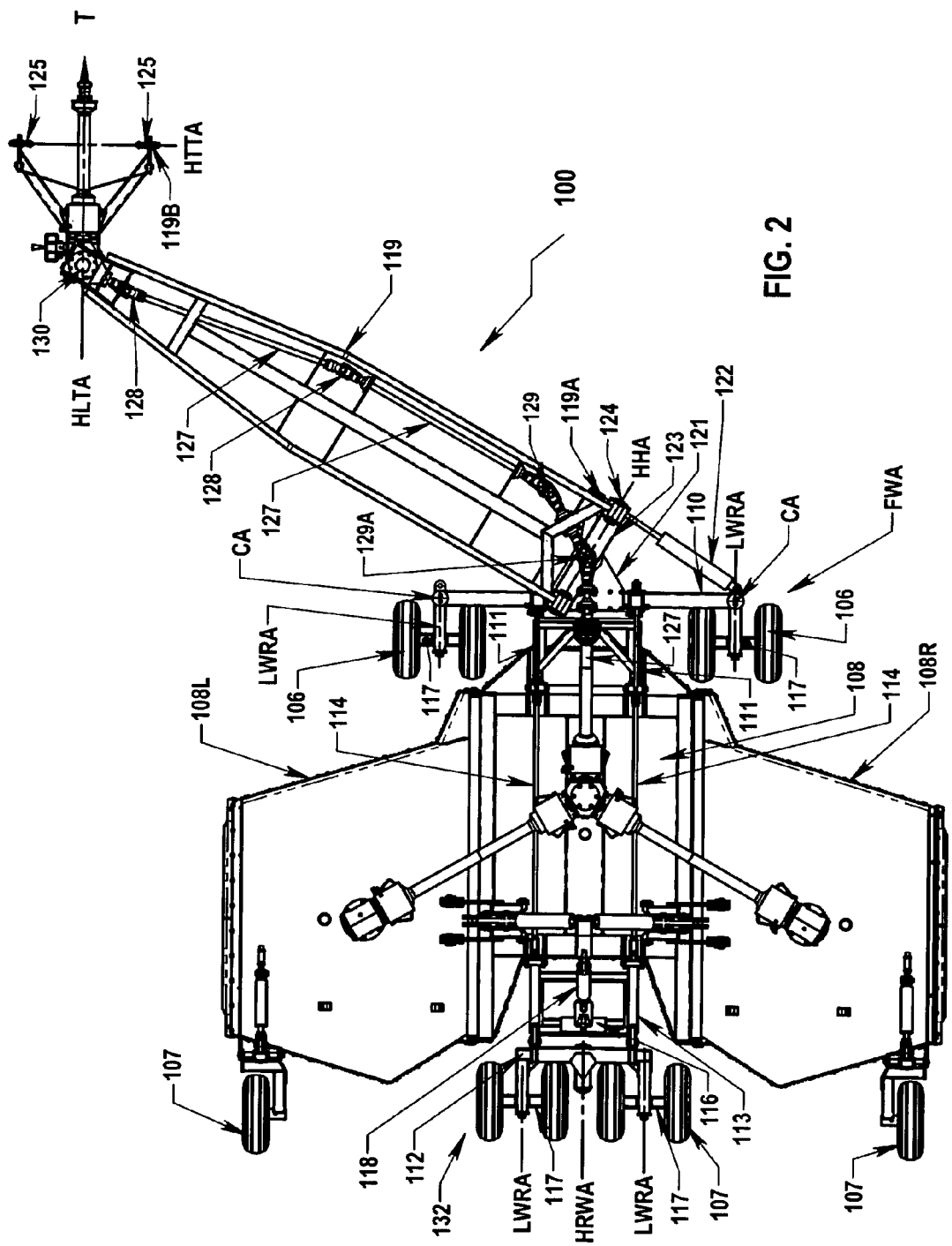
FIG. 2 is a top view of the offset floating hitch wing-type rotary mower apparatus embodiment of the invention with the floating hitch in the maximum offset position.
Figure 3:
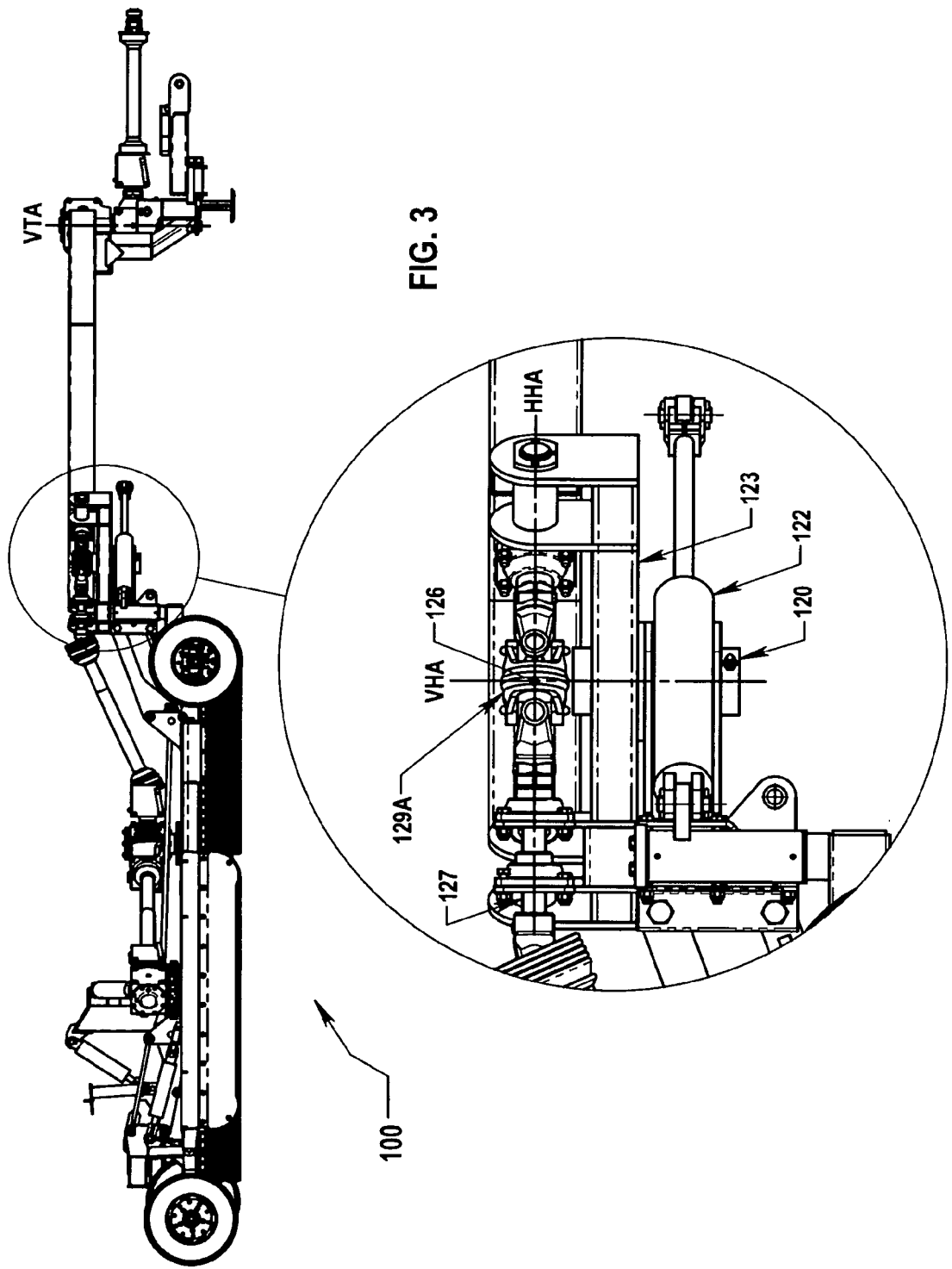
FIG. 3 is a side view of the offset floating hitch rotary mower apparatus embodiment of the invention. Detail of part of the driveline is shown.

FIGS. 1-3 illustrate an offset floating hitch wing-type rotary mower apparatus 100 adapted for attachment for towing along the ground in an operating travel direction T. The apparatus 100 comprises a central mower deck 108, and a right and left wing mower decks 108R, 108L pivotally attached to respective right and left sides of the central mower deck 108.

Rear wheels 107 are mounted behind the mower decks 108, 108R, 108L and front wheel assembly FWA is mounted to the front end of the central mower deck 108 such that the mower decks 108, 108R, 108L ride along the ground on the wheels 107, 106. A cutting blade element, which is conventional and not shown, is rotatably mounted under each mower deck 108, 108R, and 108L so as to rotate about a right, left, and central substantially vertical blade axis.

A floating hitch member 119 is pivotally attached at the mower end 119A via a vertical shaft 120 inserted in the hitch mount 121 attached to the cross member 110 so as to pivot about a substantially vertical hitch axis VHA located above and in front of the front wheel assembly FWA of the central mower deck 108.

The floating hitch member 119 is adapted for pivotal attachment at the tow end 119B thereof to the tractor about a substantially vertical tow axis VTA. A mower angle control comprising of a hydraulic cylinder 122, and a bell-crank 131 fixedly attached to the vertical shaft 120 as illustrated in FIG. 1 detail. The hitch hydraulic cylinder 122 is operative to selectively pivot the floating hitch member 119 about the vertical hitch axis VHA.

The hydraulic cylinder 122 is oriented and configured to move the rotary mower 100 through a range of offset positions between that illustrated minimum offset position in FIG. 1 and more offset position that is illustrated FIG. 2. For a reasonable sized tractor, the greatest offset will be a position wherein the angle of the floating hitch member 119 is somewhat less than perpendicular to the operating travel direction T. The configuration can be changed to provide a desired range.

Refer to FIG. 2 the attachment at the hitch member ends 119A, 119B further allows the floating hitch member 119 and mower deck 108 to float with respect to the tractor to follow the contours of the ground. The hitch mower end 119A is pivotally attached to the hitch standard 123 on the hitch mount 121 about a substantial horizontal hitch axis HHA oriented transversely to the floating hitch member 119.

The axis HHA is provided by pins 124 on the hitch standard 123. At the opposite tow end 119B the floating hitch member 119 is attached to a tractor attachment adaptor that provides a substantially horizontal longitudinal tow axis HLTA oriented substantially parallel to the operating travel direction T, and a substantially horizontal transverse tow axis HTTA substantially perpendicular to the operating travel direction T. Pins 125 pass through holes in the ends of the conventional hitch arms of a tractor to provide the axis HTTA. Thus the offset rotary mower apparatus 100 can float independent with respect to the tractor to follow the ground.

A drive is adapted for connection to the tractor and operative to transfer power to the tractor to rotate the cutting blade element. A mechanical drive is incorporated in the embodiments of FIG. 1-3 Alternatively the drive could be hydraulic, requiring only connection of flexible hydraulic line from the tractor to hydraulic motors mounted on the central mower deck 108.

In the embodiments of FIG. 1-3 the horizontal hitch axis HHA intersects the vertical hitch axis VHA at an intersection point 126 above the hitch standard 123 and the vertical shaft 120 as illustrated in FIG. 3 detail. FIGS. 2 and 3 illustrates the driveline comprising a series of drive shafts 127, universal joints 128, and double universal joints 129, arranged such that the intersection of the vertical hitch axis VHA and the horizontal hitch axis HHA is located substantially in the center of the double universal joint 129A.

The double universal joints 129 and universal joints 128 allows connections of the drive shafts 127 where the alignment is at an angle and the location of the HHA at the center of the double universal joint 129A allows proper operation of the drive when the hitch pivots about the horizontal hitch axis HHA with respect to the front wheel assembly FWA and the attached rotary mower decks 108, 108R, and 108L.

The location of the vertical hitch axis VHA at the center of the double universal joint 129A allows for proper operation of the drive when the hydraulic actuator 122 of the mower angle control is used to vary the offset of the rotary mower apparatus 100.

The drive line comprising of drive shafts 127, universal joints 128, and double universal joints 129 is substantially aligned with the floating hitch member 119 and is adapted at the tow end 119B thereof for pivotal connection via a primary shaft to a power output shaft of the tractor through another universal joint 128 and stacked gearboxes 130 which pivot with respect to each other about the vertical tow axis VTA.

The front end of the central mower deck 108 is supported by the front wheel assembly FWA comprising two castering wheel assemblies 101 attached at opposite ends to the cross member 110. Front parallel linkages 111 are pivotally attached at rear ends thereof to opposite sides of the central mower deck 108 and at the front ends thereof to a cross member 110. This cross member 110 does not pivot with respect to the central mower deck 108.

Refer to FIG. 2, to allow the central mower deck 108 to follow the ground and provide a satisfactory cut, a dual rear wheels system 132 is used. This system 132 comprises two sets of dual rear wheel 107 and each wheel 107 in the set is attached to an end of an axle 117. The two axles 117 are pivotally attached to the walking beam standard 112 about a substantial horizontal longitudinal wheel-rocking axis LWRA. The wheels 107 follow the center mower deck 108 where the walking beam standard 112 is pivotally attached to the rear cross member 116 about a horizontal rear walking axis HRWA. The rear cross member 116 is attached to the rear of the central mower deck 108 by a pair of rear parallel linkages 113 that are connected to the front parallel linkages 111 by connecting rods 114 such that the front and rear wheels 106, 107 move up and down in concert, and the caster axes CA are maintained substantially vertical so that proper castering action occurs. A hydraulic actuator 118 is attached to the rear cross member 116 at one end and to the rear of the center mower deck 108 at the other end to effect this movement.

The foregoing is considered as illustrative only of the principals of the invention. Further, since numerous changes and modifications will occur to those skilled in the art, it is not desired to limit the invention to the exact construction and operation shown and described, and accordingly, all such suitable changes or modifications in structure or operation which may be resorted to fall within the scope of the claimed invention.

I claim:

1. A rotary mower apparatus adapted for attachment to a tractor attachment adaptor on a tractor for towing along the ground in an operating travel direction, the apparatus comprising;
   a central mower deck and right and left wing mower decks pivotally attached to respective right and left sides of the central mower deck;
   a front wheel assembly comprising of at least two caster wheels, a cross member, and front parallel linkages mounted to the front end of the central mower deck, and
   a plurality of rear wheels mounted behind the mower decks such that the mower decks ride along the ground on the wheels;
   a cutting blade element rotatably mounted under each mower deck so as to rotate about right, left, and central substantially vertical blade axis;
   a hitch mount attached to the cross member of the front wheel assembly;
   a hitch standard;
   a vertical shaft fixedly attached to the hitch standard;
   a floating hitch member pivotally attached to the front wheel assembly of the central mower deck via the vertical shaft inserted in the hitch mount attached to the cross member, so as to pivot about a substantially vertical hitch axis located coincidental with the vertical shaft and in front of the front wheel assembly; where the floating hitch member is further pivotally attached to the front wheel assembly via the hitch standard on the hitch mount about a substantially horizontal hitch axis oriented transversely to the floating hitch member; where the substantially horizontal hitch axis is provided by pins on the hitch standard; where the floating hitch member is adapted for pivotal attachment at a tow end thereof to the tractor attachment adaptor; where the attachments at the tow end or the floating hitch member provides a substantially vertical tow axis, a substantially horizontal longitudinal tow axis oriented substantially parallel to the operating travel direction, and a substantially horizontal transverse tow axis oriented substantially perpendicular to the operating travel direction; and where the pivotal attachments on the floating hitch member at both the mower end and the tow end further allow the floating hitch member and mower decks to float independent with respect to the tractor to follow contours of the ground;
   a drive adapted for connection to the tractor and operative to transfer power from the tractor to rotate the cutting blade element;
   a mower angle control comprising a hydraulic actuator 122 and a bell crank fixedly attached to the vertical shaft, operative to selectively pivot the floating hitch member about the substantially vertical hitch axis located in front of the front wheel assembly of the central mower deck.

2. The apparatus of claim 1 where the said drive comprises; gearboxes, drive shafts, universal joints, and double universal joints, and where the drive is arranged substantially aligned with the floating hitch member; and
   where the substantially horizontal hitch axis intersects the substantially vertical hitch axis at a point above the hitch standard and the vertical shaft and this point is located substantially in the center of a double universal joint 129A and where the location of the substantially horizontal hitch axis at the center of the double universal joint 129A allows proper operation of the drive when the floating hitch member pivots about the substantially horizontal hitch aids with respect to the attached front wheel assembly of the central mower deck.

3. The apparatus of claim 1 where the drive comprises; gearboxes, drive shafts, universal joints, and double universal joints; and where the drive is arranged substantially aligned with the floating hitch member; and
   where the substantially vertical hitch axis intersects the substantially horizontal hitch axis at a point coincidental with the vertical shaft and located substantially in the center of a double universal joint 129A, and where the location of the substantially vertical hitch axis at the center of the double universal joint 129A allows for proper operation of the drive when the mower angle control is used to vary the offset of the rotary mower apparatus.

4. A rotary mower apparatus adapted for attachment to a tractor attachment adaptor on a tractor for towing along the ground in an operating travel direction, the apparatus comprising;
   a central mower deck and right and left wing mower decks pivotally attached to respective right and left sides of the central mower deck;
   a front wheel assembly comprising of at least two caster wheels, a cross member, and front parallel linkages mounted to the front end of the central mower deck; and
   a plurality of rear wheels mounted behind the mower deck such that the mower decks ride along the ground on the wheels;
   a cutting blade element rotatably mounted under each mower deck so as to rotate
   about right, left, and central substantially vertical blade axis;
   a hitch mount attached to the cross member of the front wheel assembly
   a hitch standard;
   a vertical shaft fixedly attached to the hitch standard;
   a floating hitch member pivotally attached to the front wheel assembly of the central mower deck via the vertical shaft inserted in the hitch mount attached to the cross member so as to pivot about a substantially vertical hitch axis located in front of the front wheel assembly; where the floating hitch member is further pivotally attached to the front wheel assembly via the hitch standard on the hitch mount about a substantially horizontal hitch axis oriented transversely to the floating hitch member, where the substantially horizontal hitch axis is provided by pins on the hitch standard; and where the floating hitch member is adapted for pivotal attachment at a tow end thereof to the tractor attachment adapter, the pivotal attachment at the tow end of the floating hitch member provides a substantially vertical tow axis, a substantially horizontal longitudinal tow axis oriented substantially parallel to the operating travel direction, and a substantially horizontal transverse tow axis oriented substantially perpendicular to the operating travel direction; and where the pivotal attachments at both the tow end of the floating hitch member, and the mower end of the floating hitch member further allowing the floating hitch member and mower decks to float with respect to the tractor to follow contours of the ground;
   a mower angle control comprising a hydraulic actuator 122 and a bell crank fixedly attached to the vertical shaft operative to pivot the floating hitch member about the substantially vertical hitch axis with respect to the front wheel assembly of the central mower deck;
   a drive adapted for connection to the tractor and operative to transfer power from the tractor to rotate the cutting blade element; where the drive comprises; gearboxes, drive shafts, universal joints, and double universal joints; and where the drive is arranged substantially aligned with the floating, hitch member; and where the substantially vertical hitch axis intersects the substantially horizontal hitch axis at a point coincidental with the vertical shaft and this point is located substantially in the center of a double universal joint 129A;

where the location of the substantially vertical hitch axis at the center of the double universal joint 129A allows for proper operation of the drive when the mower angle control is used to vary the offset of the rotary mower apparatus;

where the substantially horizontal hitch axis intersects the substantially vertical hitch axis at a point above the hitch standard and the vertical shaft and this point is located substantially in the center of the double universal joint 129A; and where the location of the substantially horizontal hitch axis at the center of the double universal joint 129A allows proper operation of the drive when the floating hitch member pivots about the substantially horizontal hitch axis with respect to the attached front wheel assembly of the central mower deck.

5. A rotary mower apparatus adapted for attachment to a tractor attachment adaptor on a tractor for towing along the ground in an operating travel direction, the apparatus comprising;

a central mower deck and right and left wing mower decks pivotally attached to respective right and left sides of the central mower deck;

a cutting blade element rotatably mounted under each mower deck so as to rotate about right, left, and central substantially vertical blade axis;

a front wheel assembly comprising at least two caster wheels each having a caster axis, a cross member, and front parallel linkages mounted to the front end of the central mower deck;

a hitch mount attached to the cross member of the front wheel assembly;

a hitch standard;

a vertical shaft fixedly attached to the hitch standard;

a floating hitch member pivotally attached to the front wheel assembly of the central deck via the vertical shaft inserted in the hitch mount attached to the cross member, so as to pivot about a substantially vertical hitch axis located coincidental with the vertical shaft and in front of the front wheel assembly; where the floating hitch member is further pivotally attached to the front wheel assembly via the hitch standard on the hitch mount about a substantially horizontal hitch axis oriented transversely to the floating hitch member, where the substantially horizontal hitch axis is provided by pins on the hitch standard; and where the floating hitch member is adapted for pivotal attachment at the tow end to the tractor attachment adaptor on the tractor;

a drive comprising of gearboxes, drive shafts, universal joints and double universal joints adapted for connection to the tractor and operative to transfer power from the tractor to rotate the cutting blade element;

a mower angle control comprising a hydraulic actuator 122 and a bell crank fixedly attached to the vertical shaft operative to selectively pivot the floating hitch member about the substantially vertical hitch axis located in front of the front wheel assembly of the central mower deck; and a plurality of wheels mounted behind the mower decks such that the mower decks ride along the ground on the wheel;

where the plurality of wheels mounted behind the central mower deck is a dual rear wheel system comprising of four rear wheels, two axles, a walking beam standard, a rear cross member, a pair of rear parallel linkages, connecting rods, and a hydraulic actuator 118;

where the dual rear wheel system has two sets of dual rear wheels and each rear wheel in the set is attached to an end of the axle;

where the two axles are pivotally attached to the walking beam standard about a substantially horizontal longitudinal wheel-rocking axis;

where the walking beam standard is pivotally attached to the rear cross member about a horizontal rear walking axis;

where the rear cross member is attached to the rear of the central mower deck by the pair of rear parallel linkages;

where the rear parallel linkages are connected to the front parallel linkages of the front wheel assembly by the connecting rods such that the front and rear wheels move up and down in concert and the caster axes on the caster wheels of the front wheel assembly are maintained substantially vertical so that proper castering action occurs; and where the hydraulic actuator 118 is attached to the rear cross member at one end and to the rear of the central mower deck at the other end to effect the movement of the front and rear wheels up and down.

\* \* \* \* \*